June 12, 1923.
R. REED
CUSHION WHEEL
Filed Sept. 30, 1922
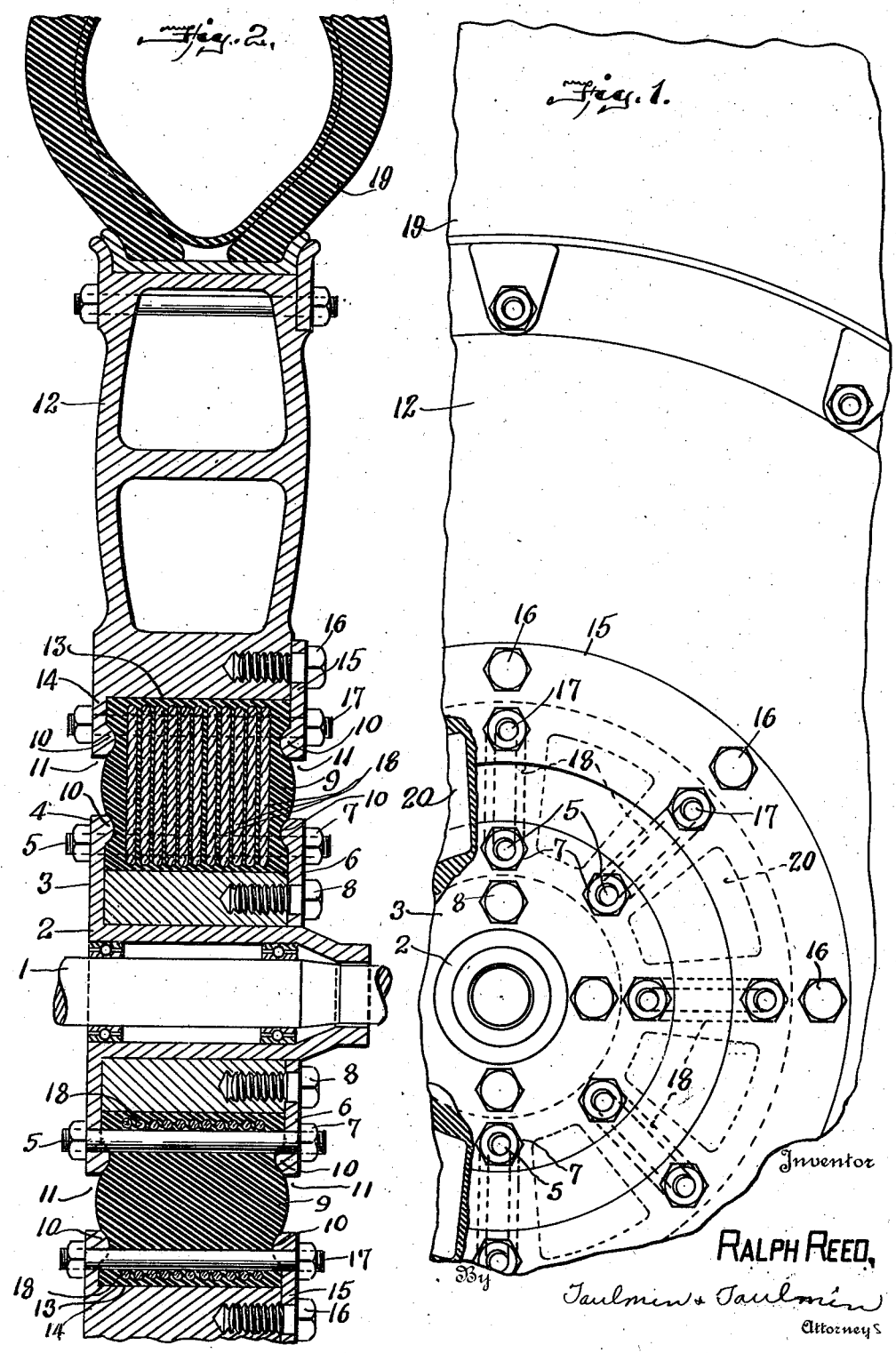
Inventor
RALPH REED,
By Taulmin & Taulmin
Attorneys Patented June 12, 1923.

1,458,148

UNITED STATES PATENT OFFICE.

RALPH REED, OF CINCINNATI, OHIO.

CUSHION WHEEL.

Application filed September 30, 1922. Serial No. 591,615.

*To all whom it may concern:*

Be it known that I, RALPH REED, a citizen of the United States, residing at Cincinnati, in the county of Hamilton and State of Ohio, have invented certain new and useful Improvements in Cushion Wheels, of which the following is a specification, reference being had therein to the accompanying drawing.

My invention relates to wheels and in particular to resilient mounting and shock absorbing features of such wheels.

It is an object of my invention to provide a wheel which will have interposed in the line of shock a resilient element suitably reinforced which will permit of the maximum flexibility thereof.

It is a further object of my invention to provide no metal to metal or other solid material contact between the wheel proper and the hub so that all vibrations and minute shocks may be completely absorbed and dampened to prevent their transmission to the vehicle supported on such wheels embodying my invention.

It is a further object of my invention to provide a series of textile members so arranged in units that the textile members are resilient and flexible.

It is a further object of my invention to provide such elements to form means for taking up driving strains, braking strains, and the shock of starting and stopping so that such shocks and strains will not tear or abrade or otherwise injure the cushioning or resilient elements.

It is an object to provide such reinforcing element imbedded in the medium which will readily move in said medium yet not destroy it.

It is a further object of my invention to provide a construction which will permit of the incorporation of certain pneumatic features.

It is an object to provide a construction which may be placed on the wheel or removed as a unit for the ready renewal or adjustment of the resilient members.

Referring to the drawings.

Fig. 1 is a side elevation of a portion of the wheel;

Fig. 2 is a section on the line 2—2 of Fig. 1;

Referring to the drawings in detail, 1 is an axle upon which there is mounted the wheel. This axle is immediately engaged by a hub portion 2 of the wheel upon which is mounted the hub proper 3. The hub 3 is provided with an inner annular flange 4 that extends upwardly along one margin and is provided with a plurality of apertures through which the bolts 5 are introduced.

On the other side of the wheel a plate of detachable character designated 6 is provided. This plate has a plurality of apertures to receive the other ends of the bolts 5 upon which are mounted the nuts 7.

This plate is retained on the hub 3 by the screws or bolts 8. Between the flange 4 and the plate 6 there is formed a channel in which the lower portion of the resilient element 9 is located. Inwardly extending shoulders 10 are provided on the upper and inner edges of 4 and 6 to engage with the resilient element 9 for the purpose of forcing the resilient element 9 to engage tightly with 3 and 13.

It will be understood that the resilient element 9 is provided with a series of apertures through which the bolts 5 pass. A space 11 separates the hub portion of the wheel from the rim portion. The rim portion is designated 12, and may be of any desired construction. The inner part of 12 also has a channel 13 formed by an integral side wall 14 and a detachable plate on the other side designated 15 which is retained on 12 by the screws or bolts 16. The inwardly projecting shoulders 10 are also provided on 14 and 15. Likewise these members have apertures for the reception of the bolts 17 which pass through apertures in the resilient element 9.

A series of loops of cords 18 are provided imbedded in the resilient element 9 and are looped around the bolts 5 and 17.

Such loops may be of one continuous piece or separate pieces to constitute each loop.

The material composing the loop is similar to that found in a cord tire. It may be made up of single strands or a plurality of strands. These strands may be independent or they may be woven into a fabric and the loop fabric located around the bolts in the resilient medium.

In practice I prefer a series of individual cords composed of a plurality of spirally wound strands. Such loops of cords are easily manufactured, economical, and readily assembled in the resilient medium giving the strength of direct contact and engagement of solid materials with the advantage of yielding character and shock absorbing characteristics of the medium in which such cords are imbedded.

The wheel may be provided with a pneumatic or solid tire 19 or with a metal rim as desired.

In some instances I may provide air spaces 20 to form a combined pneumatic and solid element interposed between the hub and periphery of the wheel.

It will be noted that I preferably locate my reenforcing units at equidistant points about the periphery of the hub on the radius emanating from the wheel center and that I provide a series of these reinforcing units of a breadth substantially of the thickness of the wheel. By utilizing a large number of these very light and flexible units I am enabled to get great strength without injuring the resilient characteristics of the medium 9.

It will be understood that I comprehend within my invention suitable modifications and adaptations of the invention to various wheels.

Having thus fully described my invention, what I claim as new and desire to secure by Letters Patent, is:—

1. In combination in a wheel, a hub portion, a rim portion and an intermediate resilient element with a plurality of reinforcing members therein joining said wheel portions to one another, said reenforcing members being engaged at their inner and outer extremities respectivly with substantial rigid portions of the hub and rim.

2. In combination in a wheel, a hub portion, a rim portion and an intermediate resilient element with a plurality of reinforcing members therein joining said wheel portions to one another said reinforcing members consisting of cords, said cords having their outer portions engaging with a rigid part of the rim portion of the wheel, and their inner portions engaging with a rigid part of the hub portion of the wheel.

3. In combination in a wheel, a hub portion, a rim portion and an intermediate resilient element with a plurality of reinforcing members therein joining said wheel portions to one another said reinforcing members consisting of cords arranged in groups, said cords having their outer portions engaging with a rigid part of the rim portion of the wheel, and their inner portions engaging with a rigid part of the hub portion of the wheel.

4. In combination in a wheel, a hub portion, a rim portion and an intermediate resilient element with a plurality of reinforcing members therein joining said wheel portions to one another said reinforcing members consisting of cords arranged in groups said groups being disposed equidistant from one another, said cords having their outer portions engaging with a rigid part of the rim portion of the wheel, and their inner portions engaging with a rigid part of the hub portion of the wheel.

5. In combination in a wheel, a hub portion, a channel formed by integral walls on one edge of the periphery of the hub portion, a detachable plate on the other edge and a resilient element located in said channel, a plurality of bolts passing through said resilient element, and the walls forming the channel; a rim portion of the wheel having a similar inwardly disposed channel for the reception of the resilient element, one wall of said channel being detachable and bolts passing through the resilient element and the channel walls and reinforcing means in said resilient element said reinforcing means being looped around oppositely disposed pairs of the respective bolts carried by the respective portions of the wheel.

6. In a method of assembling a shock absorbing wheel mounting a hub portion upon an axle, mounting an annular resilient element having a plurality of reinforcing members imbedded therein upon the periphery of the hub, clamping said member in position on said hub, mounting a rim portion of a wheel on said resilient member, clamping said rim portion of the wheel on the resilient member, and inserting bolts through clamping members and resilient element on the hub and rim portions of the wheel respectively so as to have the reinforcing in the resilient element complete.

7. In combination in a wheel, a hub portion, a rim portion and resilient element interposed between, reinforcing members located in said resilient element, and air spaces located therebetween in the resilient element, and detachable members for retaining said resilient and reinforcing elements in position.

In testimony whereof, I affix my signature.

RALPH REED.